(12) United States Patent
Schmalholz et al.

(10) Patent No.: US 10,530,765 B2
(45) Date of Patent: *Jan. 7, 2020

(54) SECURING CONNECTIONS TO UNSECURE INTERNET RESOURCES

(71) Applicant: TEAM INTERNET AG, Munich (DE)

(72) Inventors: Robert Schmalholz, Munich (DE); Mario Witte, Munich (DE); Benjamin Schwenk, Mertert (LU)

(73) Assignee: Team Internet AG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/700,834

(22) Filed: Sep. 11, 2017

(65) Prior Publication Data

US 2018/0013752 A1    Jan. 11, 2018

Related U.S. Application Data

(63) Continuation of application No. 14/988,995, filed on Jan. 6, 2016, now Pat. No. 9,762,571.

(Continued)

(51) Int. Cl.
*H04L 29/06* (2006.01)
*H04L 29/08* (2006.01)
*H04L 9/30* (2006.01)

(52) U.S. Cl.
CPC ............ *H04L 63/0823* (2013.01); *H04L 9/30* (2013.01); *H04L 65/1069* (2013.01);
(Continued)

(58) Field of Classification Search
CPC .............. H04L 63/0823; H04L 63/168; H04L 65/1069; H04L 69/22; H04L 9/30
(Continued)

(56) References Cited

U.S. PATENT DOCUMENTS

| 7,181,762 | B2* | 2/2007 | Jerdonek | H04L 9/32 |
| | | | | 726/2 |
| 9,276,818 | B2* | 3/2016 | Turon | H04W 76/10 |
| 9,331,990 | B2* | 5/2016 | Le Saint | H04L 9/3247 |
| 9,602,497 | B2* | 3/2017 | LeSaint | H04L 9/3247 |
| 10,193,879 | B1* | 1/2019 | Rodgers | H04L 63/0281 |

(Continued)

OTHER PUBLICATIONS

Extension and design of secure dynamic updates in domain name systems, Shim et al. 10, 1109/APCC, 1999.820467, IEEE 1999.

(Continued)

*Primary Examiner* — Jahangir Kabir
(74) *Attorney, Agent, or Firm* — Roach Brown McCarthy & Gruber, P.C.; Kevin D. McCarthy

(57) ABSTRACT

A computer program product having a computer readable non-transitory storage medium. The storage medium having encoded thereon a computer code for instructing at least one hardware processor to automatically: (a) intercept a plurality of data packets transported over a computer network; (b) analyze said plurality of data packets to identify at least one secure connection request to an unsecure domain hosted on at least one web server; (c) retrieve a digital security certificate for the unsecure domain from a trusted certification authority; (d) associate the digital security certificate with the unsecure domain, thereby converting the unsecure domain to a secure domain; (e) send the digital security certificate to at least one second client terminal. Thereby the computer program product facilitates a secure connection between the at least one second client terminal and the secure domain.

18 Claims, 5 Drawing Sheets

Related U.S. Application Data

(60) Provisional application No. 62/243,334, filed on Oct. 19, 2015.

(52) U.S. Cl.
CPC ............. *H04L 67/02* (2013.01); *H04L 67/10* (2013.01); *H04L 67/2823* (2013.01); *H04L 67/303* (2013.01); *H04L 67/42* (2013.01); *H04L 69/22* (2013.01)

(58) Field of Classification Search
USPC ........................................................ 726/1–7
See application file for complete search history.

(56) References Cited

U.S. PATENT DOCUMENTS

| | | | |
|---|---|---|---|
| 2002/0095569 | A1 | 7/2002 | Jerdonek |
| 2014/0337619 | A1* | 11/2014 | Brown .................. H04L 9/3268 713/157 |
| 2015/0304847 | A1 | 10/2015 | Gong |
| 2015/0358293 | A1* | 12/2015 | Wood ...................... H04L 63/10 726/4 |

OTHER PUBLICATIONS

Autonomous DNSSEC: Secured pseudo DNS domains for personal networks, Kubota et al. 10.1109/CLOCOMW 2010.5700204, IEEE, 2010.

\* cited by examiner

SECURING CONNECTIONS TO UNSECURE INTERNET RESOURCES

RELATED APPLICATION/S

This application claims the benefit of priority under 35 USC § 119(e) of U.S. Provisional Patent Application No. 62/243,334 filed Oct. 19, 2015, the contents of which are incorporated herein by reference in their entirety.

FIELD OF THE INVENTION

The present invention relates to the field of Internet connection security.

BACKGROUND

Internet resources made available between web servers and client terminals using domain names, domains, subdomains, or the like, are defined by the Internet address the resources are located at. Domains are described, for example, in Mockapetris, P., "Domain names—concepts and facilities", IETF STD 13, RFC 1034 [online], November 1987 [retrieved on 2015 Sep. 30], retrieved from the Internet: tools.ietf.org/html/rfc1034, DOI: 10.17487/RFC1034, incorporated herein by reference in its entirety. In further example, domains are described in Mockapetris, P., "Domain names—implementation and specification", IETF STD 13, RFC 1035 [online], November 1987, [retrieved on 2015 Sep. 30], retrieved from the Internet: http://tools.ietf.org/html/rfc1035, DOI: 10.17487/RFC1035, incorporated herein by reference in its entirety. The Internet resource and client data transferred between the client terminal and the web server may be transferred in an unencrypted connection, such as using a hypertext transfer protocol (HTTP), or on a secure and encrypted connection, such as using HTTP (HTTPS).

Web servers usually provide secure connections to client terminal web browsers and/or applications using transport layer security (TSL) protocols, secure socket layer (SSL) protocols, and/or the like. The TSL protocol is described, for example, in Dierks et al., "The Transport Layer Security (TLS) Protocol Version 1.2", IETF RFC 5246, [online], August 2008 [retrieved on 2015 Sep. 30], retrieved from the Internet: tools.ietf.org/html/rfc6101, DOI: 10.17487/RFC5246, incorporated herein by reference in its entirety. Such secure connections may use a secure Internet address port 443, a digital certificate, and/or the like. When the client terminal application requires a secure connection, a clienthello security message is sent encapsulated inside a data packet of the computer network infrastructure. The web server may receive secure connection requests to multiple virtual and/or real web sites managed by the server. The clienthello message may include a Server Name Indication (SNI) field to allow the web server to determine the hostname and respective digital certificate to send to the client terminal thereby enabling the secure connection. The SNI protocol extension is described, for example, in Blake-Wilson et al., "Transport Layer Security (TLS) Extensions", IETF RFC 3546 [online], June 2003 [retrieved on 2015 Sep. 30], retrieved from the Internet: tools.ietf.org/html/rfc3546, DOI 10.17487/RFC3546, incorporated herein by reference in its entirety.

A digital certificate (DC) may be issued by a certification authority (CA), such as Comodo, Symantec, GoDaddy, GlobalSign, DigiCert, and the like. Certificate and certification standards are described, for example, in Cooper et al., "Internet X.509 Public Key Infrastructure Certificate and Certificate Revocation List (CRL) Profile", IETF RFC 5280 [online], May 2008, [retrieved on 2015 Sep. 30], retrieved from the Internet: tools.ietf.org/html/rfc5280, DOI: 10.17487/RFC5280, incorporated herein by reference in its entirety. The digital certificate includes a public key, the identity of the owner, and the like. The client terminal can then validate the identity of the CA and thereby the validity of the public key before facilitating the secure connection with the web server. Thus the privacy and integrity of the data exchanged between the client terminal and the web server is ensured.

Data encapsulation layers of an Internet protocol include a link layer for physical transport of data packets, an Internet layer for directing the packets to the web servers, a transport layer that may include security protocols, and an application layer that transfers the data between the cline terminal and the web server applications, such as a hypertext transfer protocol (HTTP) and the like. HTTP standards are described, for example, in Fielding et al., "Hypertext Transfer Protocol—HTTP/1.1", IETF RFC 2616 [online], June 1999, [retrieved on 2015 Sep. 30], retrieved from the Internet: tools.ietf.org/html/rfc2616, DOI: 10.17487/RFC2616, incorporated herein by reference in its entirety. When an application or user of a client terminal requires a secure connection, a special request is made to provide security of the transport layer to application layer, such as using a HTTP Secure (HTTPS) protocol. An application running on the client terminal may require a secure connection to a web server and an HTTPS protocol command is sent to the web server, such as HTTPS://secureconnection.webserver.com/secure_commenction.html and the like. Such as protocol command initiates a clienthello message encapsulated in the data packet to facilitate a secure connection to the web server before transferring date between the client terminal and the web server. The clienthello message may contain the SNI field to allow the web server to return the correct DC for the hostname secureconnection.webserver.com.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools, and methods which are meant to be exemplary and illustrative, not limiting in scope.

There is provided, in accordance with some embodiments, a method comprising using one or more hardware processors for performing the method actions. The method comprises an action of automatically intercepting two or more data packets transported over a computer network, where the data packets originated from one or more client terminals, and where the data packets each comprises one or more transport layer security protocol messages. The method comprises an action of automatically analyzing the data packets to identify one or more secure connection requests to an unsecure domain hosted on one or more web servers, where the secure connection request(s) was received from one of the client terminal(s). The method comprises an action of automatically retrieving a digital security certificate for the unsecure domain from a trusted certification authority. The method comprises an action of automatically associating the digital security certificate with the unsecure domain, thereby converting the unsecure domain to a secure domain. The method comprises an action of automatically sending the digital security certificate to a second client terminal in response to a future secure connection request, thereby facilitating a secure connection between the second client terminal and the secure domain.

In some embodiments, the analyzing is performed by identifying, in some of the data packets, data packets corresponding to a clienthello-type message of a transport layer security protocol, and for each identified clienthello-type message, locating a domain name indication, where the method further comprises statistically analyzing the domain name indications to determine that the secure connection request is a legitimate client request for a secure connection to the unsecure domain.

In some embodiments, the method further comprises an action of determining the legitimate request by counting a number of unique client terminals requesting the secure connection to the unsecure domain, where each the unique client terminal is determined to be associated with a legitimate client from parameters of the identified clienthello-type message.

In some embodiments, the number of unique client terminals is above a predefined threshold.

In some embodiments, the second client terminal is one of the client terminal(s). In some embodiments, the associating comprises hosting the unsecure domain on a virtual web host.

In some embodiments, the method further comprises an action of comparing, based on a certificate rule, the unsecure domain with a list of domains that are each associated with a client rule function, where the client rule function is a function of two or more client terminal parameters associated with the client terminal(s).

In some embodiments, the client terminal parameters are analyzed from some of the data packets.

In some embodiments, the method further comprises an action of searching for some of the client terminal parameters within Internet resources associated with some data from some of the data packets.

In some embodiments, the analyzing uses a blacklist of two or more words associated with illegitimate requests for secure connections.

In some embodiments, the method further comprises a restart operation to the hardware processor(s) following the associating.

There is provided, in accordance with some embodiments, a computer program product comprising a computer readable non-transitory storage medium. The storage medium has encoded thereon a computer code for instructing one or more hardware processors to automatically intercept two or more data packets transported over a computer network, where the data packets originated from one or more client terminals, and where the data packets each comprises one or more transport layer security protocol messages. The computer code for instructs the hardware processor(s) to automatically analyze the data packets to identify one or more secure connection requests to an unsecure domain hosted on one or more web servers, where the secure connection(s) request was received from one of the client terminal(s). The computer code instructs the hardware processor(s) to automatically retrieve a digital security certificate for the unsecure domain from a trusted certification authority. The computer code instructs the hardware processor(s) to automatically associate the digital security certificate with the unsecure domain, thereby converting the unsecure domain to a secure domain. The computer code instructs the hardware processor(s) to automatically send the digital security certificate to one or more second client terminals in response to one or more future secure connection requests, thereby facilitating a secure connection between the second client terminal(s) and the secure domain.

In some embodiments, the analyzing is performed by identifying, in some of the data packets, data packets corresponding to a clienthello-type message of a transport layer security protocol, and for each identified clienthello-type message, locating a domain name indication, where the analyzing further comprises statistically analyzing the domain name indications to determine that the secure connection request is a legitimate client request for a secure connection to the unsecure domain.

In some embodiments, the computer code instructs the hardware processor(s) to determine the legitimate request by counting a number of unique client terminals requesting the secure connection to the unsecure domain, where each the unique client terminal is determined to be associated with a legitimate client from parameters of the identified clienthello-type message.

In some embodiments, the number of unique client terminals is above a predefined threshold.

In some embodiments, the second client terminal is one of the client terminal(s).

In some embodiments, the associating comprises hosting the unsecure domain on a virtual web host.

In some embodiments, the computer code further compares, based on a certificate rule, the unsecure domain with a list of domains that are each associated with a client rule function, where the client rule function is a function of two or more client terminal parameters associated with the client terminal(s).

In some embodiments, the client terminal parameters are analyzed from some of the data packets.

In some embodiments, the computer code further comprises searching for some of the client terminal parameters within Internet resources associated with some data from some of the data packets.

There is provided, in accordance with some embodiments, a computerized system comprising a network interface controller and a non-transient computer-readable storage medium. The medium has stored thereon processor instructions for automatically intercepting two or more data packets transported via the network interface controller, where the data packets originated from one or more client terminals, and where the data packets each comprises one or more transport layer security protocol messages. The medium has stored thereon processor instructions for automatically analyzing the data packets to identify one or more secure connection requests to an unsecure domain hosted, where the secure connection request(s) was received from one of the client terminal(s). The medium has stored thereon processor instructions for automatically retrieving the digital certificate for the unsecure domain from a trusted certification authority. The medium has stored thereon processor instructions for automatically associating the digital certificate with the unsecure domain, thereby converting the unsecure domain to a secure domain. The medium has stored thereon processor instructions for automatically sending the digital certificate to one or more second client terminals in response to one or more future secure connection requests, thereby facilitating a secure connection between the second client terminal(s) and the secure domain. The computerized system comprises one or more hardware processors configured to execute the processor instructions.

In some embodiments, the analyzing is performed by identifying, in some of the data packets, data packets corresponding to a clienthello-type message of a transport layer security protocol, and for each identified clienthello-type message, locating a domain name indication, where the method further comprises statistically analyzing the domain name indications to determine that the secure connection request is a legitimate client request for a secure connection to the unsecure domain.

In some embodiments, the medium has stored thereon processor instructions for determining the legitimate request by counting a number of unique client terminals requesting the secure connection to the unsecure domain, where each the unique client terminal is determined to be associated with a legitimate client from parameters of the identified clienthello-type message.

In some embodiments, the number of unique client terminals is above a predefined threshold.

In some embodiments, the second client terminal is one of the client terminal(s).

In some embodiments, the associating comprises hosting the unsecure domain on a virtual web host.

In some embodiments, the medium has stored thereon processor instructions for comparing, based on a certificate rule, the unsecure domain with a list of domains that are each associated with a client rule function, where the client rule function is a function of two or more client terminal parameters associated with the client terminal(s).

In some embodiments, the client terminal parameters are analyzed from some of the data packets.

In some embodiments, the medium has stored thereon processor instructions for searching for some of the client terminal parameters within Internet resources associated with some data from some of the data packets.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
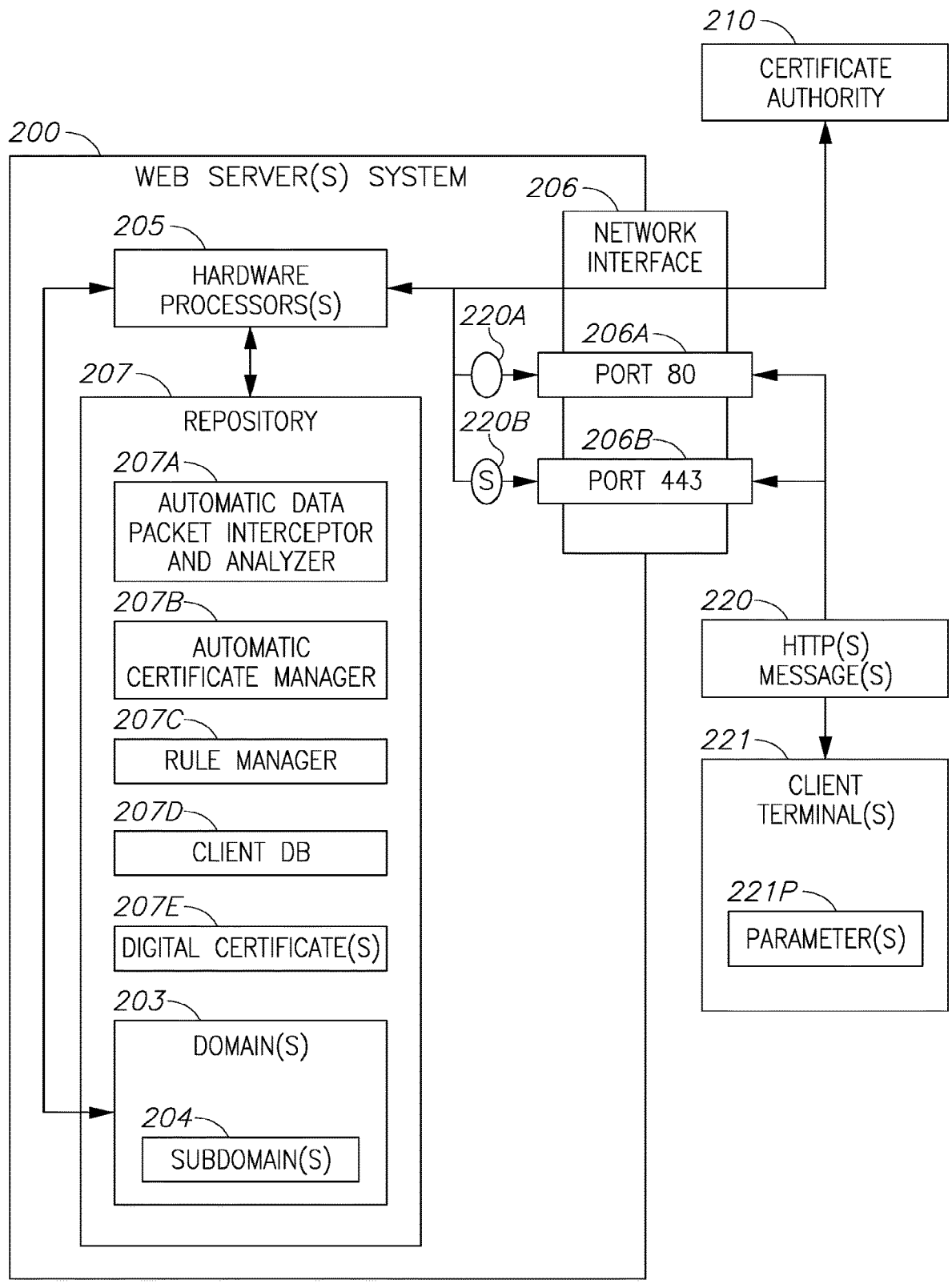
FIG. 1 shows a schematic illustration of a system for automatically securing unsecure domains, according to embodiments of the invention.

According to embodiments of the present invention, there are provided methods, devices, and systems to facilitate secure connections between client terminals and unsecure web domains. Methods may comprise actions of automatically intercepting data packets sent to a web server to identify client terminal requests for secure data connections, such as hypertext transfer protocol secure (HTTPS) connection requests, to unsecure Internet resources, such as web domains. The data packets are analyzed to identify the Internet resource requested and the client terminal(s) that are requesting the connection. When the Internet resource and client terminal(s) meet a rule that defines allowable access and/or allowable client terminal(s), a public key certificate, such as a digital certificate, is acquired for the secure connection to be initiated the next time a client terminal requests access to the Internet resource.

Using one or more hardware processors, the web server hosting the unsecure domain may automatically determine that the request for a secure connection was initiated by a legitimate end user of the client terminal. Unsecure domains are, for example, domains that do not have associated digital certificates. The secure connection request is, for example a clienthello message as defined by the transport layer security (TLS) protocol, is automatically identified in a data packet, and a server name identification is automatically located, for example in the clienthello message using the Server Name Identification (SNI) field. By automatically analyzing the data packet information, the Internet protocol address (IP) of the client terminal may be determined. When a rule regarding the acquisition of a digital certificate (DC) for the unsecure domain is satisfied, the hardware processor automatically acquires the DC, and automatically associates the DC with the unsecure domain for sent in response to new client terminal requests for a secure connection. This allows automatically converting the unsecure domain into a secure domain when a legitimate client attempts to access the domain.

Embodiments of the present invention may allow preventing secure connection requests from web crawlers, such as web bots, automated processes, and the like, that are not the intended legitimate clients of the Internet resource and/or domain. Embodiments of the present invention may allow automatically identifying unsecure domains that client terminals are trying to access using a secure connection, and convert the unsecure domains to secure domains being thereby allowing secure connection access to web domains that were not previously accessible.

Optionally, a blacklist of words is maintained to prevent the web server from facilitating a secure connection to the web domain and/or Internet resource from clients that are not legitimate end users or approved by the owner of the resource. For example, if a secure connection is requested from a client terminal that has the word Google, Crawler, and the like associated with the IP address of the client terminal, the secure connection request is determined to be associated with a web crawler and not a legitimate end user.

Optionally, secure connection requests are concentrated on one or more subdomains of a web domain, and a DC is retrieved for each relevant one or more subdomain.

Optionally, a web server restart is initiated after a predefined number of new DCs has been associated with Internet resources on the web server, thereby updating the corresponding DNS entries. Optionally, when two or more hardware processors and/or subsystems exist for a web server system, the two or more hardware processors and/or subsystems are restarted on a rolling basis to prevent a loss of service condition.

Reference is now made to FIG. 1, which is a schematic illustration of a system 200 for automatically securing unsecure domains 203, according to embodiments of the invention. A web server system 200 may comprise one or more hardware processors 205, such as in a web server farm, a series of rack servers, two or more cores in a single hardware processor, two or more processors in a single blade server, and the like, which are examples of multiple processors for managing web resources. FIG. 1 and other drawings describe a simple example embodiment, where the web resource hosting environment is also a computerized system carrying out the embodiment, but in other embodiments, actions may be distributed differently between one or more hardware processors in a virtualized web resource environment, a system of systems, and the like. System 200 comprises a network interface 206 for communicating with a certificate authority 210 and one or more client terminals 221. For example, certificate authority 210 receives an application programming interface (API) communication from hardware processor 205 requesting a digital certificate 207E for a domain 203 through network interface 206. The hardware processor(s) 205 may receive HTTP(S) 220 protocol data packets from client terminal(s) 221 through network interface 206. Network interface 206 may comprise a specific port 206A, such as port 80, for non-secure protocol data packets 220A, and a specific port 206B, such as port 443, for secure data packets 220B.

Web server system 200 may comprise a local or networked repository 207, such as a non-transient computer-readable storage medium, a hard disk, a network attached storage, and the like, for storing a program code. Specifically, a program store may store program code for an automatic data packet interceptor and analyzer 207A that comprises program code to instruct hardware processor(s) 205 to intercept HTTP(S) data packets 220 and determine the domain name of a domain 203 and/or subdomain name of a subdomain 204 stored on repository 207. Data packet interceptor and analyzer 207A may also determine one or more parameters 221P of client terminal(s) 221, such as IP address, physical location, ownership, user name, client terminal type, and/or the like, and store client terminal parameters 221P in a client terminal database (DB) 207D. For example, a client terminal type may be a virtual terminal operated by a web crawler, and the owner name may be Google™, such as a web crawler and the like. A rule manager 207C may comprise program code to instruct hardware processor(s) 205 to retrieve a digital certificate 207E from analysis of domain names and client terminal parameters 221P. An automatic certificate manager 207B may comprise program code to instruct hardware processor(s) 205 to retrieve a digital certification (DC) 207E from certificate authority 210, and may store DC 207E on repository 207. The program code for performing the actions described herein may be arranged in modules as described or in other modules according to requirements.

Figure 2A:
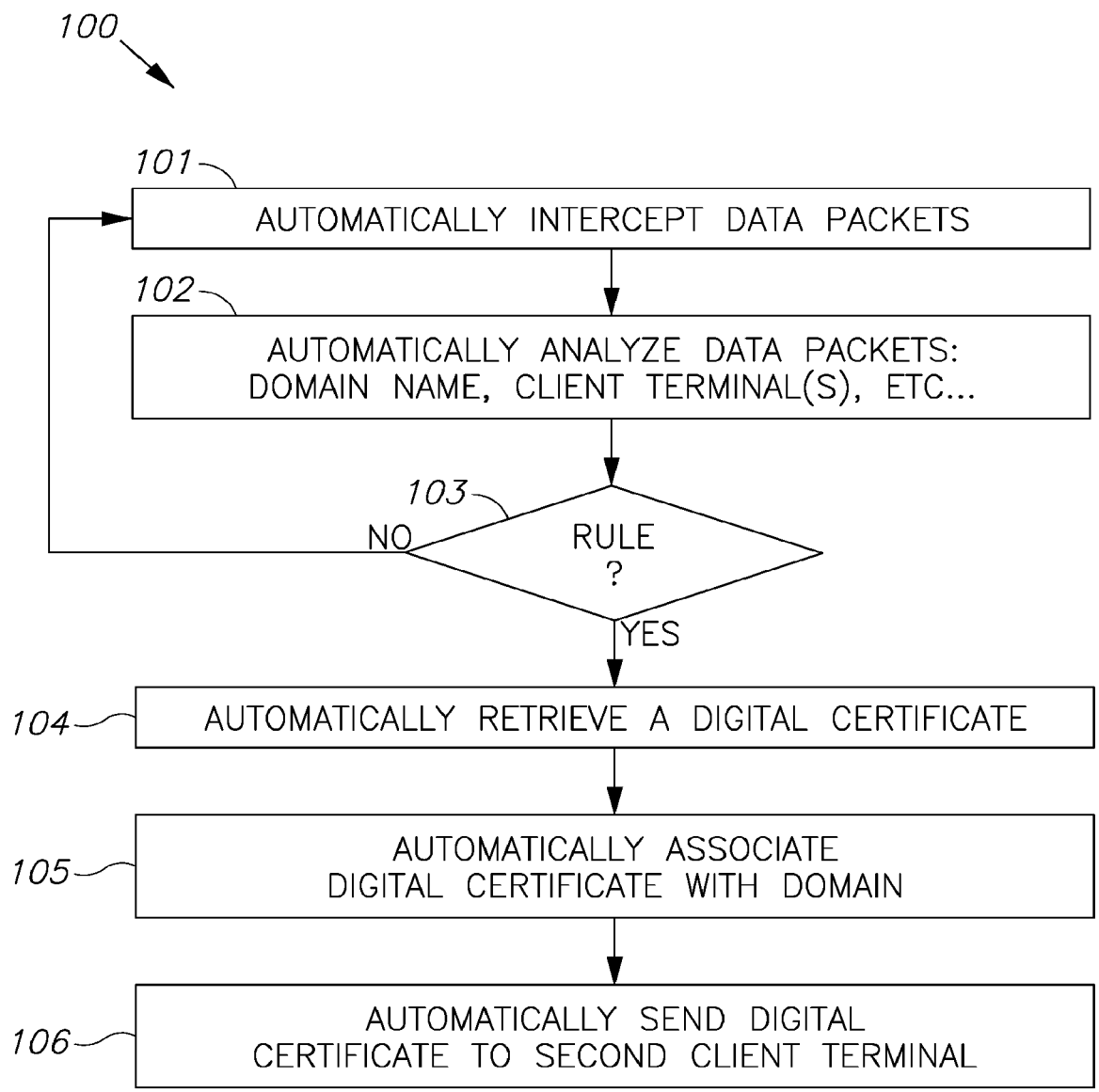
FIG. 2A shows a flowchart of an automatic method for securing unsecure domains, according to embodiments of the invention.

Reference is now made to FIG. 2A, which is a flowchart of an automatic method 100 for securing unsecure domains, according to embodiments of the invention. Method 100 comprises an automatic action of intercepting 101 data packets, such as by copying data packets from hardware port 443 as at 206B of FIG. 1, for example by inserting an operating system service to instruct hardware processor(s) 205 to intercept data packets. Method 100 comprises an automatic action of analyzing 102 the data packets to determine a name of a domain 203 and/or subdomain 204, client terminal parameters 221P, and the like. Optionally, client terminal parameters 221P are stored in a client terminal database 207D. When client terminal parameters 221P comply with a rule 103 for domain 203 and/or subdomain 204, a digital certificate 207E is automatically retrieved 104 and automatically associated 105 with corresponding domain 203 and/or subdomain 204 on web server system 205. Program code stored in a rule manager 207C may instruct hardware processor(s) 205 to determine when a rule and/or condition is met 103, such as when a client terminal from a target neighborhood has accessed the web domain. When a new client terminal requests a secure connection for domain 203 and/or subdomain 204, a corresponding digital certificate 207E is sent 106 during the TLS protocol negotiation between the new client terminal and web server 200.

Figure 2B:
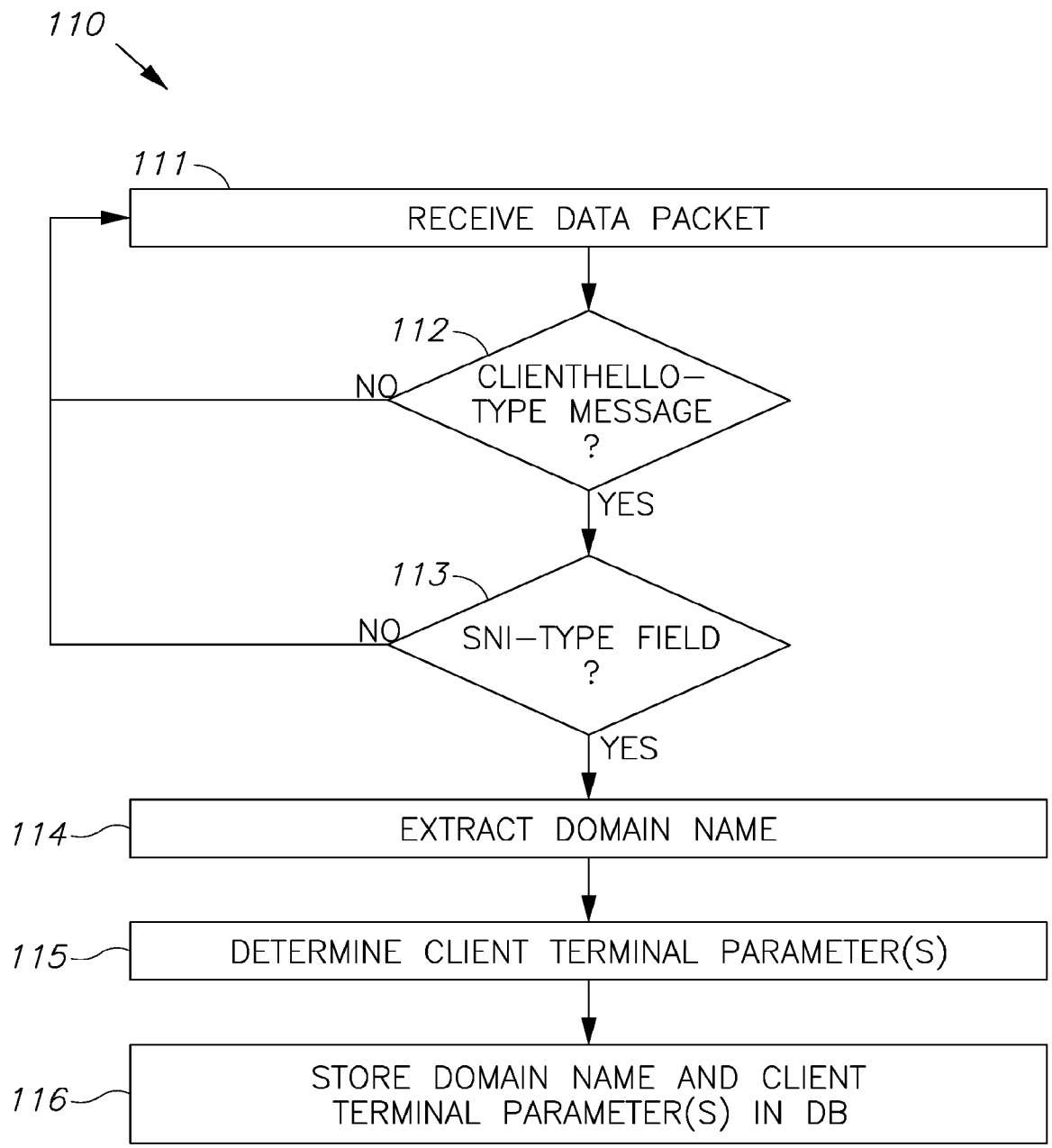
FIG. 2B shows a flowchart of an automatic method for determining unsecure domain names, according to embodiments of the invention.

Reference is now made to FIG. 2B, which is a flowchart of an automatic method 110 for determining unsecure domain names, according to embodiments of the invention. When a data packet is received 111 via network interface 206 of FIG. 1, hardware processor(s) 205 identifies when the data packet contains a request for a secure connection, such as a clienthello message 112. Program code stored in a data packet interceptor and analyzer 207A may instruct hardware processor(s) 205 to determine when 112 a data packet 220 contains a clienthello message. When the data packet contains the clienthello message, hardware processor(s) 205 determine if the message also contains a domain and/or subdomain identifier, such as a server name identifier 113. When both conditions 112 and 113 exist, a domain name is extracted 114 from the data packet. Optionally, client terminal parameters 221P are determined 115 from a data packet, such as a client terminal Internet protocol address, MAC address, geographical location, user name, and the like. Optionally, secondary parameters are determined 115 by searching for data packet parameters, such as using a search engine, an information service, a database, and the like. The domain name and client terminal parameters 221P may be stored 116 in a client DB for further use.

Figure 2C:
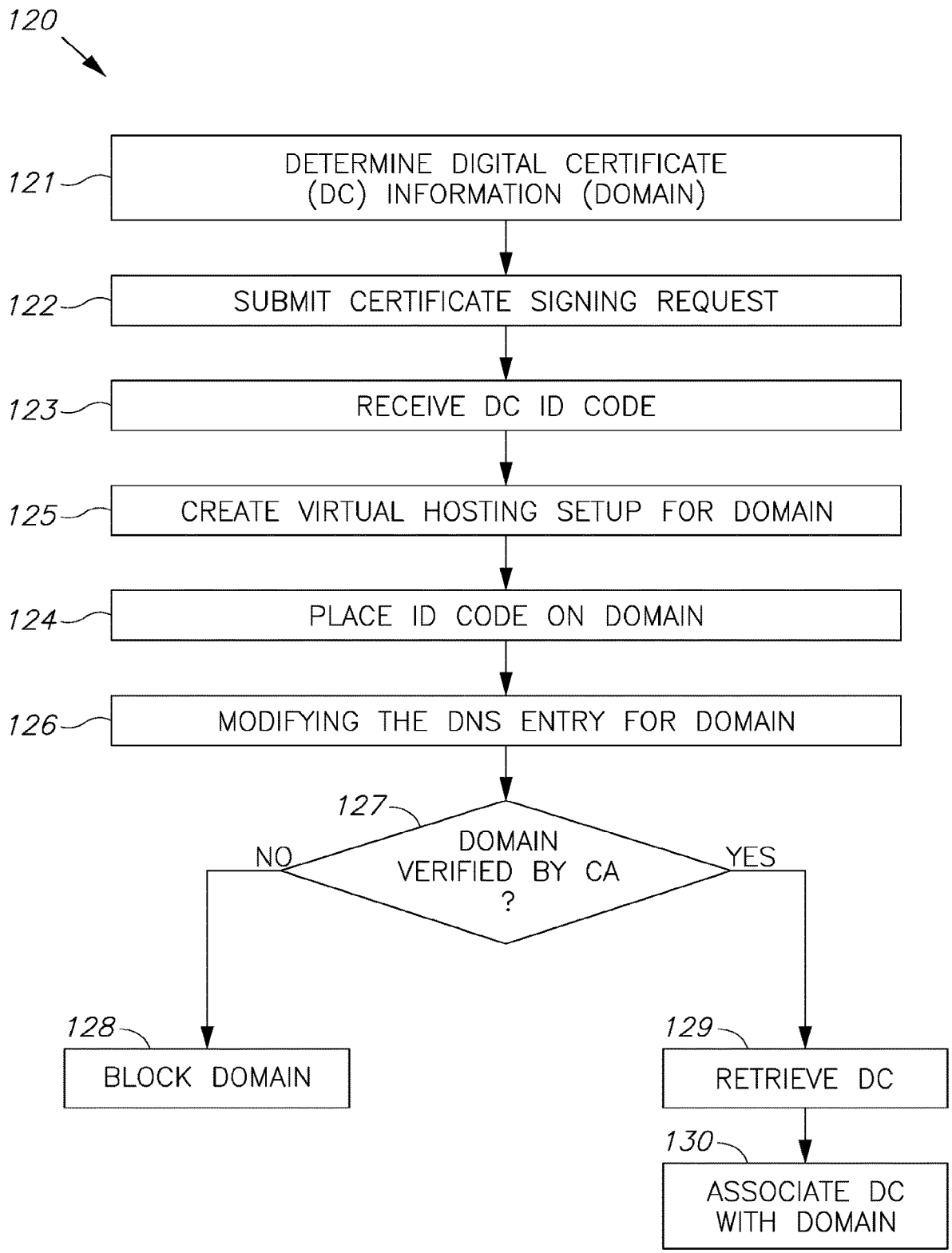
FIG. 2C shows a flowchart of an automatic method for obtaining digital certificates for unsecure domains, according to embodiments of the invention.

Reference is now made to FIG. 2C, which is a flowchart of an automatic method 120 for obtaining digital certificates for unsecure domains, according to embodiments of the invention. When data in received data packets has complied with a rule, a digital certificate information is determined 121, such as domain name, domain owner, and the like. The DC information is submitted automatically 122 on a certificate signing request, such as using an API interface to certificate authority (CA) 210. Web server system 200 receives 123 from CA 210 a DC identification (ID) code. A virtual hosting setup, such as a virtual web host, may be created 125 for domain 203 and/or subdomain 204, and the DC ID code is placed 124 on the domain, such as in a hypertext markup language document, a web document, a text document, and/or the like. Hardware processor(s) 205 may send a request to modify 126 the domain name server entry for the domain if needed. When the domain is verified by CA 127, the DC is retrieved 129 from CA 210, and associated 130 with the domain name on web server system 200.

Figure 2D:
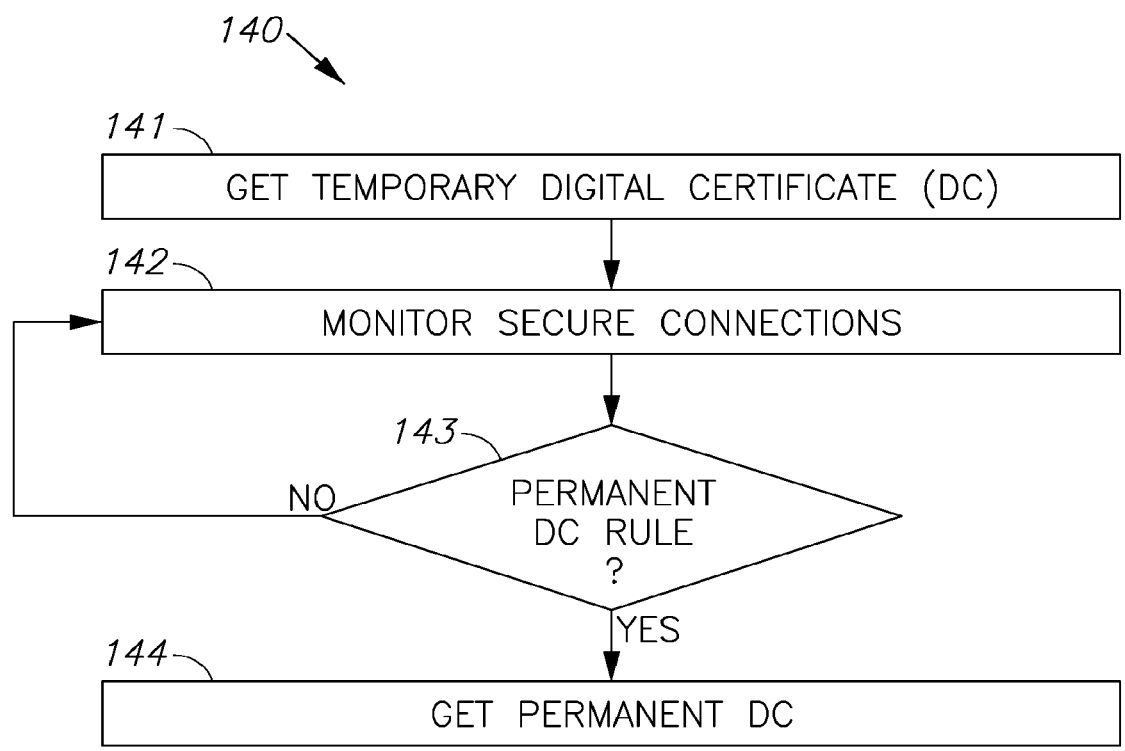
FIG. 2D shows a flowchart of an automatic method for converting temporary digital certificates to permanent digital certificates, according to embodiments of the invention.

Reference is now made to FIG. 2D, which is a flowchart of an automatic method 140 for converting temporary digital certificates to permanent digital certificates, according to embodiments of the invention. Optionally, a temporary DC is retrieved 141 and associated with the domain name prior to retrieving 144 a permanent DC. For example, a web server 200 monitors 142 a secure connection until a permanent DC rule is satisfied 143 and then the permanent DC is retrieved. When a number of unique client terminals exceeds a predefined threshold determined by a permanent DC rule, a permanent DC may be retrieved 144.

In some embodiments of the invention, public key encryption is used to establish secure data connections between a client terminal and an Internet Resource hosted on a web server. The resource owner is contacted to approve the secure connection for the client terminal, and the owner allows a temporary or permanent public key certificate for encryption of the secure data connection. The certificate includes information on the key, the owner and a digital signature verifying the contents of the certificate. The certificate allows the owner to control the access of client terminals to the Internet resource, for example by digital certificates provided by a certificate authority and described herein as TLS and/or SSL security.

When a web server receives a secure connection request to an unsecure Internet resource, such as a web domain without a DC, the connection is rejected and the request is ignored by the server. The unsuccessful secure connection requests may not be logged by the server. Since there is log on the server of unsuccessful requests, the web server is not capable of automatically detecting these requests and taking corrective action to secure the unsecure Internet resource. Embodiments of the present invention allow detecting these requests associating a temporary or permanent DC with the Internet resource.

Since many new web sites may be experimental, temporary, transitional, and the like, the cost of acquiring a digital certificate (DC) from a large numbers of new sites may be very high. Furthermore, many web crawlers, bots, Internet search providers, and the like, are not the intended clients for the web sites but may continuously and frequently access web sites to acquire information on the web sites for their own purposes. An owner of a web site, a web hosting service, and the like may want to optimize the expenses acquiring DCs for multiple sites by postponing the acquisition as much as possible, avoid acquiring DCs for obsolete or unused web sites, and the like.

In some secure connection request circumstances, a web server may have a very large list of DCs for an Internet resource, and send a truncated list of DCs to the client terminal to avoid overloading the network connection bandwidth. In these cases, some embodiments of the invention may determine the correct DC to send the client based on information in the client terminal database.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method comprising using at least one hardware processor for:
   automatically intercepting a plurality of data packets transported over a computer network, by copying the data packets from port 443 of at least one web server, wherein said plurality of data packets originated from at least one client terminal, and wherein said plurality of data packets each comprises at least one transport layer security protocol message;
   automatically analyzing said plurality of data packets to identify at least one secure connection request to an unsecure domain hosted on at least one web server, wherein said analyzing is performed by checking if a Server Name Indication (SNI) field in a Transport Layer Security (TLS) handshake protocol lists a domain name for which a digital certificate does not exist on the at least one web server, and wherein said at least one secure connection request was received from at least one of said at least one client terminal;
   automatically retrieving a digital security certificate for said unsecure domain from a trusted certification authority;
   automatically associating said digital security certificate with said unsecure domain, thereby converting said unsecure domain to a secure domain, wherein said associating comprises hosting said unsecure domain on a virtual web host; and
   automatically sending said digital security certificate to a second client terminal in response to a subsequent secure connection request, thereby facilitating a secure connection between said second client terminal and said secure domain; and
   wherein automatically means without any user intervention.

2. The method of claim 1, wherein said analyzing is performed by:
   identifying, in some of said plurality of data packets, data packets corresponding to a clienthello-type message of a transport layer security protocol; and
   for each identified clienthello-type message, locating a domain name indication,
   wherein the method further comprises statistically analyzing said domain name indications to determine that said secure connection request is a legitimate client request for a secure connection to said unsecure domain.

3. The method of claim 2, further comprising an action of determining said legitimate request by counting a number of unique client terminals requesting said secure connection to said unsecure domain, wherein each said unique client terminal is determined to be associated with a legitimate client from parameters of said identified clienthello-type message.

4. The method of claim 3, wherein said number of unique client terminals is above a predefined threshold.

5. The method of claim 1, further comprising an action of comparing, based on a certificate rule, said unsecure domain with a list of domains that are each associated with a client rule function, wherein said client rule function is a function of a plurality of client terminal parameters associated with said at least one client terminal.

6. The method of claim 5, wherein said plurality of client terminal parameters are analyzed from some of said plurality of data packets.

7. The method of claim 5, further comprising an action of searching for some of said plurality of client terminal parameters within Internet resources associated with some data from some of said plurality of data packets.

8. The method of claim 1, wherein said analyzing uses a blacklist of a plurality of words associated with illegitimate requests for secure connections.

9. A computer program product comprising a computer readable non-transitory storage medium, said storage medium having encoded thereon a computer code for instructing at least one hardware processor to:
   automatically intercept a plurality of data packets transported over a computer network, by copying the data packets from port 443 of at least one web server, wherein said plurality of data packets originated from at least one client terminal, and wherein said plurality of data packets each comprises at least one transport layer security protocol message;
   automatically analyze said plurality of data packets to identify at least one secure connection request to an unsecure domain hosted on at least one web server, wherein said analyzing is performed by checking if a Server Name Indication (SNI) field in a Transport Layer Security (TLS) handshake protocol lists a domain name for which a digital certificate does not exist on the at least one web server, and wherein said at least one secure connection request was received from at least one of said at least one client terminal;

automatically retrieve a digital security certificate for said unsecure domain from a trusted certification authority;

automatically associate said digital security certificate with said unsecure domain, thereby converting said unsecure domain to a secure domain, wherein said associating comprises hosting said unsecure domain on a virtual web host; and automatically send said digital security certificate to at least one second client terminal in response to at least one subsequent secure connection request, thereby facilitating a secure connection between said at least one second client terminal and said secure domain, and wherein automatically means without any user intervention.

10. The computer program product of claim 9, wherein said analyzing is performed by:

identifying, in some of said plurality of data packets, data packets corresponding to a clienthello-type message of a transport layer security protocol; and for each identified clienthello-type message, locating a domain name indication, wherein the analyzing further comprises statistically analyzing said domain name indications to determine that said secure connection request is a legitimate client request for a secure connection to said unsecure domain.

11. The computer program product of claim 10, further comprising determining said legitimate request by counting a number of unique client terminals requesting said secure connection to said unsecure domain, wherein each said unique client terminal is determined to be associated with a legitimate client from parameters of said identified clienthello-type message.

12. The computer program product of claim 9, further comprises comparing, based on a certificate rule, said unsecure domain with a list of domains that are each associated with a client rule function, wherein said client rule function is a function of a plurality of client terminal parameters associated with said at least one client terminal.

13. The computer program product of claim 12, wherein said plurality of client terminal parameters are analyzed from some of said plurality of data packets.

14. The computer program product of claim 12, further comprising searching for some of said plurality of client terminal parameters within Internet resources associated with some data from some of said plurality of data packets.

15. A computerized system, comprising:

a network interface controller;

a non-transient computer-readable storage medium having stored thereon processor instructions for:

automatically intercepting a plurality of data packets transported via said network interface controller, by copying the data packets from port 443 of at least one web server, wherein said plurality of data packets originated from at least one client terminal, and wherein said plurality of data packets each comprises at least one transport layer security protocol message, automatically analyzing said plurality of data packets to identify at least one secure connection request to an unsecure domain hosted on at least one web server, wherein said analyzing is performed by checking if a Server Name Indication (SNI) field in a Transport Layer Security (TLS) handshake protocol lists a domain name for which a digital certificate does not exist on the at least one web server, and wherein said at least one secure connection request was received from at least one of said at least one client terminal, automatically retrieving said digital certificate for said unsecure domain from a trusted certification authority, automatically associating said digital certificate with said unsecure domain, thereby converting said unsecure domain to a secure domain, wherein said associating comprises hosting said unsecure domain on a virtual web host, and automatically sending said digital certificate to at least one second client terminal in response to at least one subsequent secure connection request, thereby facilitating a secure connection between said at least one second client terminal and said secure domain; and wherein at least one hardware processor configured to execute said processor instructions, and wherein automatically means without any user intervention.

16. The computerized system of claim 15, wherein said analyzing is performed by:

identifying, in some of said plurality of data packets, data packets corresponding to a clienthello-type message of a transport layer security protocol; and for each identified clienthello-type message, locating a domain name indication, wherein the analyzing further comprises statistically analyzing said domain name indications to determine that said secure connection request is a legitimate client request for a secure connection to said unsecure domain.

17. The computerized system of claim 16, further determining said legitimate request by counting a number of unique client terminals requesting said secure connection to said unsecure domain, wherein each said unique client terminal is determined to be associated with a legitimate client from parameters of said identified clienthello-type message.

18. The computerized system of claim 15, further comprising comparing, based on a certificate rule, said unsecure domain with a list of domains that are each associated with a client rule function, wherein said client rule function is a function of a plurality of client terminal parameters associated with said at least one client terminal.

* * * * *